R. D. HOBBS.
CLEVIS.
APPLICATION FILED MAY 13, 1910.
981,427.
Patented Jan. 10, 1911.
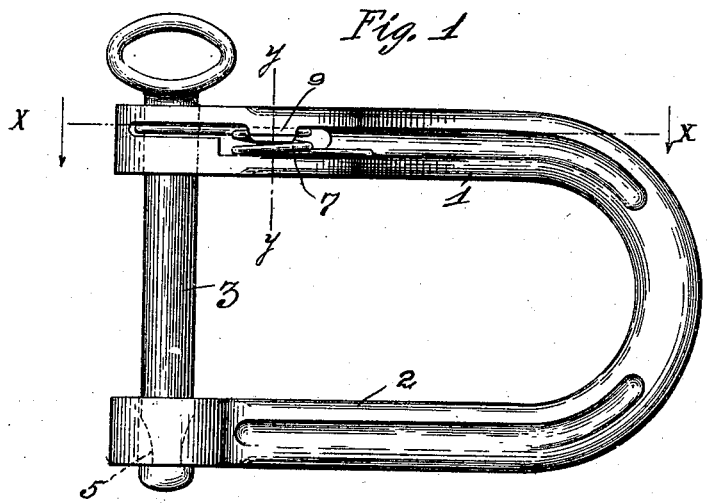
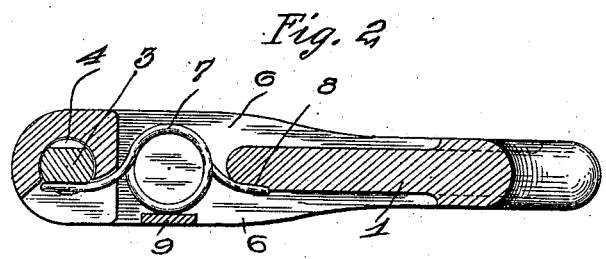
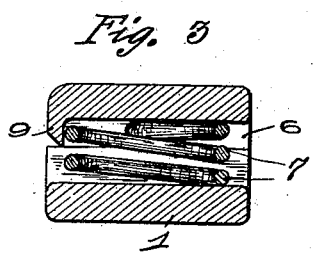
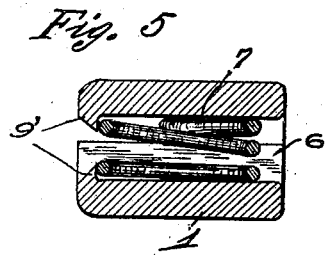
Witnesses:
M. L. Lennid
B. G. Richards
Inventor:
Robert D. Hobbs.
By Joshua R. H. Potts
His Attorney
THE NORRIS PETERS CO., WASHINGTON, D. C.

UNITED STATES PATENT OFFICE.

ROBERT D. HOBBS, OF CHICAGO, ILLINOIS.

CLEVIS.

981,427.  Specification of Letters Patent.  Patented Jan. 10, 1911.

Application filed May 13, 1910. Serial No. 561,211.

*To all whom it may concern:*

Be it known that I, ROBERT D. HOBBS, a citizen of the United States, residing at Chicago, county of Cook, and State of Illinois, have invented certain new and useful Improvements in Clevises, of which the following is a specification.

My invention relates to improvements in clevises and has for its object the provision of an improved clevis which shall be of simple construction and efficient in operation.

The invention consists in the combination and arrangement of parts hereinafter described and claimed.

The invention will be best understood by reference to the accompanying drawings forming a part of this specification, and in which, Figure 1 is a side elevation of a clevis embodying my invention, Fig. 2 is a section on line x—x of Fig. 1, Fig. 3 is a section on line y—y of Fig. 1, Fig. 4 is a detail view of the upper end of the locking pin employed in the clevis, and Fig. 5 is a sectional detail illustrating a modified form of construction.

The preferred form of construction as illustrated in the drawings comprises a clevis body provided with upper and lower arms 1 and 2 provided with alining openings at their ends adapted to receive locking pin 3. At its upper end locking pin 3 is provided with two notches 4 located in the same plane but in opposite sides of said pin and at its lower end with a continuous annular notch 5, as shown. The upper arm 1 is provided with a spring receiving recess 6 adapted to receive the helical spring 7 with one end thereof bent outwardly and resting in a recess 8 in the body of the clevis arm and the other end bearing against the side of pin 3. The entry to recess 6 is partially closed by means of an outwardly beveled projection 9, as shown, the portion of the entry to said recess left open being just sufficient to permit the passage of spring 7 when the same is compressed, projection 9 preventing removal of said spring after expansion in said recess.

By the construction above set forth it will be observed that spring 7 is adapted to lock pin 3 in operative position by engagement with one of the notches 4, but that when pin 3 is turned to a position at right angles to locking position, said spring end will ride out of the corresponding notch and leave the pin free for upward movement. When the pin is elevated sufficiently the end of spring 7 engages notch 5 in whatever position the pin happens to be and prevents removal of said pin.

In the form of construction illustrated in Fig. 5 the recess 6 is provided with outwardly beveled projections 9' at both sides of its entry and arranged to engage both ends of spring 7. Otherwise the two constructions are identical.

While I have illustrated and described the preferred form of construction for carrying my invention into effect this is capable of variation or modification without departing from the spirit of the invention. I, therefore, do not wish to be limited to the exact details of construction set forth but desire to avail myself of such variations and modifications as come within the scope of the appended claims.

Having described my invention what I claim as new and desire to secure by Letters Patent is:

1. A clevis comprising a body having upper and lower arms, there being alining openings at the ends of said arms; a pin having a continuous annular notch at its lower end and a notch in one side at its upper end; and a spring on said upper arm adapted to engage said notches, substantially as described.

2. A clevis comprising a body having upper and lower arms, there being alining openings at the ends of said arms and a spring receiving recess in the upper arm; a projection partially closing the entry to said recess; a pin having a continuous annular notch at its lower end and a notch in one side at its upper end; and a helical spring adapted to be compressed and forced into said recess with one end bearing on said pin, substantially as described.

3. A clevis comprising a body having upper and lower arms, there being alining openings at the ends of said arms and a spring receiving recess in the upper arm; an outwardly beveled projection partially closing the entry to said recess; a pin having a continuous annular notch at its lower end and non-continuous notches in opposite sides at its upper end; and a helical spring adapted to be compressed and forced into said recess with one end bearing against said pin, substantially as described.

4. A clevis comprising a body having upper and lower arms, there being alining openings at the ends of said arms and a spring receiving recess in the upper arm; outwardly beveled projections on both sides of the entry of said recess and partially closing the same; a pin having a continuous annular notch at its lower end and non-continuous notches in opposite sides at its upper end; and a helical spring adapted to be compressed and forced into said recess with one end bearing against said pin, substantially as described.

In testimony whereof I have signed my name to this specification in the presence of two subscribing witnesses.

ROBERT D. HOBBS.

Witnesses:
HELEN F. LILLIS,
JOSHUA R. H. POTTS.